Dec. 15, 1953 M. H. WESSEL 2,662,963
ELECTRIC AIR HEATER

Filed Aug. 7, 1950 3 Sheets-Sheet 1

Inventor
Melvin H. Wessel

By Lamont Johnston
Attorney

Dec. 15, 1953 M. H. WESSEL 2,662,963
ELECTRIC AIR HEATER
Filed Aug. 7, 1950 3 Sheets-Sheet 2

Inventor
Melvin H. Wessel
By Lamont Johnston
Attorney

Dec. 15, 1953 M. H. WESSEL 2,662,963
ELECTRIC AIR HEATER
Filed Aug. 7, 1950 3 Sheets-Sheet 3
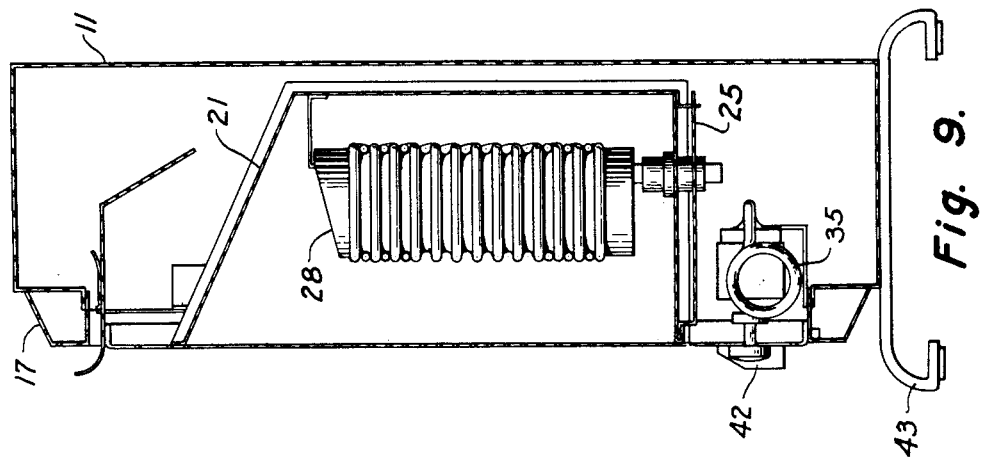
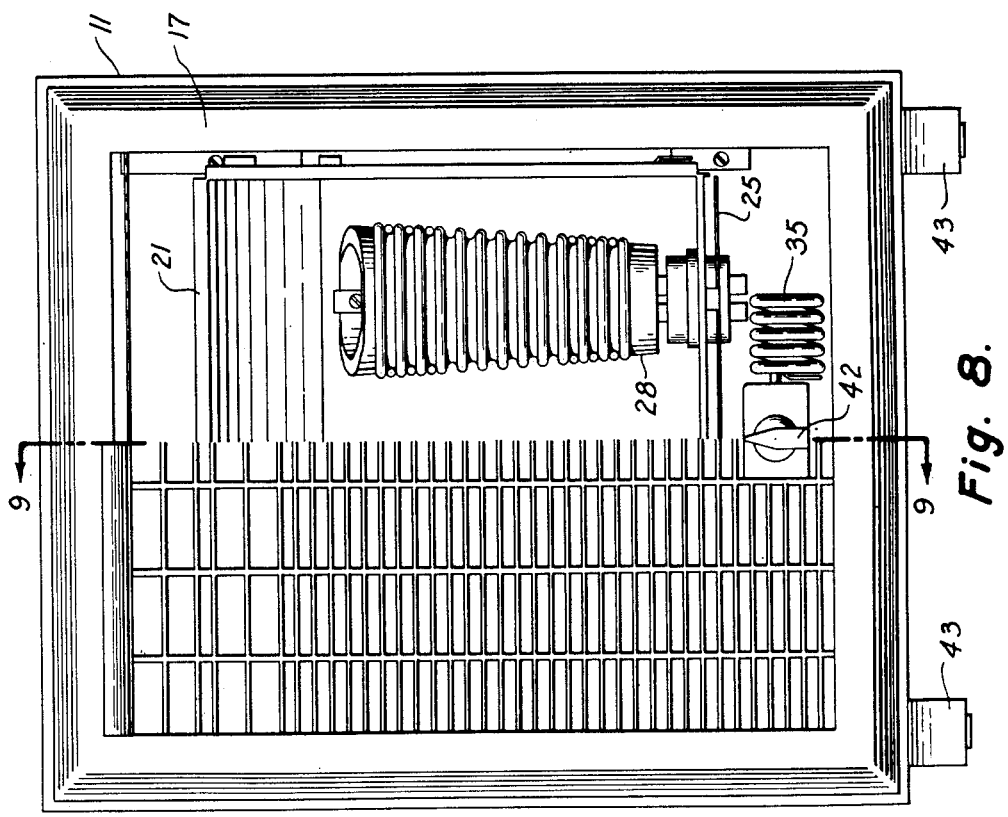
Inventor
Melvin H. Wessel
By
Lamont Johnston
Attorney Patented Dec. 15, 1953

2,662,963

UNITED STATES PATENT OFFICE 2,662,963

ELECTRIC AIR HEATER

Melvin H. Wessel, Chattanooga, Tenn., assignor to Cavalier Corporation, Chattanooga, Tenn., a corporation of Tennessee Application August 7, 1950, Serial No. 178,010

16 Claims. (Cl. 219—34)

My invention relates to an electric air heater and more particularly to such a heater of the convection type which causes a transfer of heat from a heater to a room by circulation of heated air rising from the heater, as well as by radiation.

One object of my invention is to provide a heater having elements so shaped as to promote a more rapid flow of air by convection than is prevalent in convection heaters of present types.

Another object is to provide an air heater controlled by a built-in thermostat which is so shielded from the heating elements as to provide a more accurate control of the heater than is provided by built-in thermostats in heaters of present types.

A further object of my invention is to provide a heater unit which is so constructed as to be easily opened for cleaning.

The foregoing and other objects, features and advantages of this invention will be apparent from the following description and from the accompanying drawings of preferred embodiments, it being understood that the detailed description and drawings are merely illustrative of the invention, which is defined in the claims.

In the drawings,

Figure 8 is a front elevation, partly broken away, of a portable type electrical air heater incorporating certain of the features of the present invention.

Figure 9 is a transverse sectional view taken along the line 9—9 of Figure 8.

Figure 1:
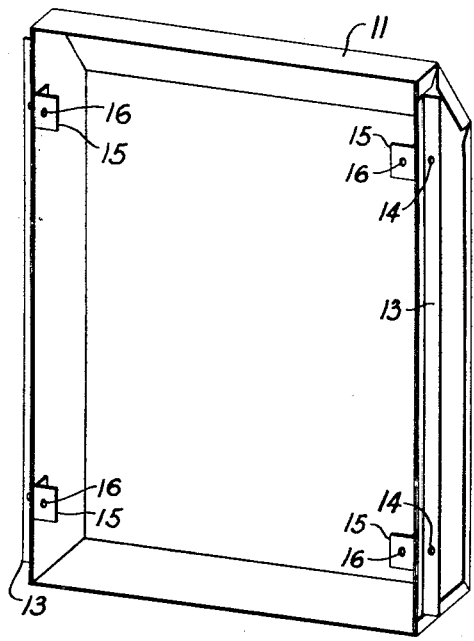
Figure 1 is a perspective view of a wall box which may be used as a casing or housing for a heater made in accordance with my invention.

Like reference numerals refer to like parts throughout the several figures of the drawings According to my invention, a wall box or casing 11, of sheet metal or other suitable material, is provided for insertion in an opening of suitable size in a wall 12. The wall box may have flanges 13 extending to each side. A plurality of holes 14 are provided in the flanges through which wood screws may be inserted to hold the flanges and the wall box in place in the wall opening. The wall box is of suitable proportions to accommodate one or more heating elements and other parts to be described hereinafter.

A plurality of clips 15 are fastened to the inner sides of the wall box 11 in any suitable manner, as by spot welding, these clips being bored to form holes 16 which are tapped to receive bolts. A frame 17 is designed so as to fit over the edges of the wall box 11 and to form a part thereof to give a finished appearance to the wall box or housing. The frame has a plurality of angle clips or tabs 18, corresponding in number and position for fastening to the clips 15 on the wall box. The tabs 18 are secured to the frame in any suitable manner, as by welding, and are bored to provide bolt holes 19 in registry with the tapped holes 16 in the clips 15. When bolts are inserted through the holes 19 and are tightened therethrough into the tapped holes 16, the frame is held firmly to the wall box and forms a part thereof.

A bracket 20 is securely fastened to the lower edge of the frame 17 for supporting a thermostat.

Figure 3:
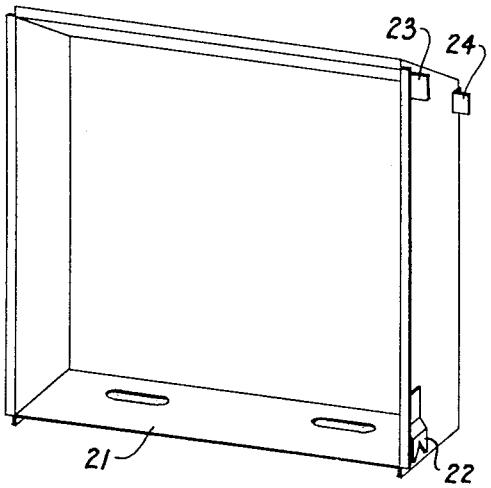
Figure 3 is a perspective view of a deflector made in accordance with my invention and adapted to be pivotally supported, as by fulcrums attached to a frame of the type illustrated in Figure 2.
Figure 2:
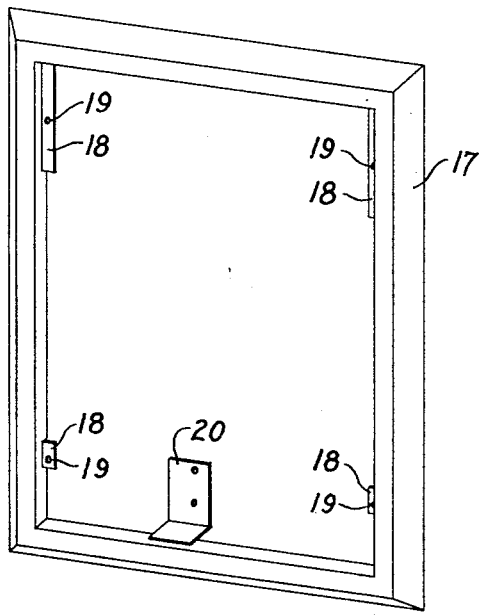
Figure 2 is a perspective view of a frame which may be attached to a wall box of the type illustrated in Figure 1 for the purpose of supporting pivotally a deflector made in accordance with my invention.
Figure 5:
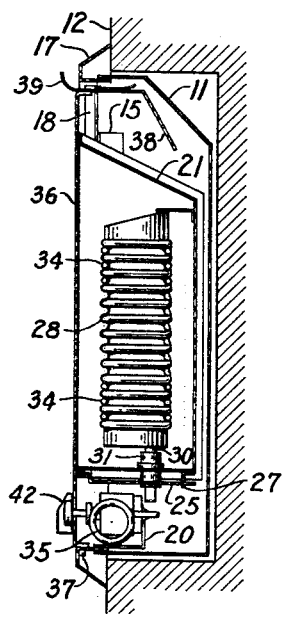
Figure 5 is a transverse sectional view taken along the line 5—5 of Figure 4.

A deflector 21, of suitable size to be enclosed within the wall box 11, is next put in place. This deflector, which is illustrated in Figure 3, comprises a boxlike structure open at its front and made of suitable sheet metal, such as aluminum or copper-clad steel. An air space, at least one-half inch wide, is provided between the wall box 11 and the back of the deflector 21 as may be seen in Figure 5, in order to keep the temperature of the wall box as low as possible. At the bottom of each of the sides of the deflector is secured a clip 22, as by spot welding or riveting, extending outwardly a small space from the sides of the deflector and having a notched or V-shaped opening in its bottom edge. The deflector 21 is adapted to be placed through the frame 17 into the wall box 11 and to be supported in this position by resting of the clips 22 upon the lower frame angles or tabs 18. Since the clips 22 are secured near the front edges of the deflector, the center of gravity of the deflector, which pivots about the tabs 18 as fulcrums, is behind these fulcrums so that gravity causes the deflector to tend to fall backwardly until the upper deflector clips 23, extending outwardly from its sides, come into contact with the upper clips 18 on the frame 17. The deflector stops 24, extending outwardly from its sides near the back of the deflector, engage the back sides of the upper clips 18 when the deflector is tilted forward for cleaning, thus limiting its forward movement to a position about 20 or 30 degrees from its normal position. In its forward position, cleaning behind the deflector, between it and the wall box 11, to remove dust, cobwebs and other dirt is a simple matter.

A short space below the bottom wall of the deflector 21 a metal plate 25, constituting a heat shield, is secured thereto, as by means of front and back clips 26 and 27. The air space between the deflector and the plate 25, which has substantially the same shape as the bottom wall of the deflector, constitutes an insulation between the heating elements supported in the deflector and a thermostat secured below the plate 25. By having this double metallic wall, forming a heat shield or baffle, the thermostat is more effectively insulated from the heat generated by the heating elements than in prior constructions, in which only a single plate was provided. This feature reduces the overall height of the heater and thus makes feasible its installation under low windows; it also saves materials.

At least one heating element 28 is secured to the bottom wall of the deflector 21. A suitable manner for securing each element in place is by passing its parallel electrodes 29 and 30 through an insulating bushing 31 which passes through the bottom wall of the deflector and through the plate 25, suitable terminals for attaching the lead-in wires being provided at the lower ends of the electrodes. The elements 28 are flat at their bottoms and are supported with their bottoms spaced above the bottom wall of the deflector box 21, so that air coming in to be heated in the elements passes above the surface of the bottom of the deflector. This also assists in reducing the temperature at the thermostat. The elements may be held in place at their tops by means of a single screw 32, so that they may be easily removed and replaced, when necessary.

The heating elements 28 comprise hollow cores made of a die pressed or molded refractory ceramic material and having vertical flues 33 formed therein for the passage of convective currents of air. The outer surface of each core is grooved and disposed within these grooves lies a coiled resistance wire 34, this manner of construction being old and well known in the art. If desired, the wire 34 may be covered with a relatively thin layer of refractory ceramic material in order to reduce the radiation temperature of the element and also to eliminate the hazard of electrical shock.

Figure 4:
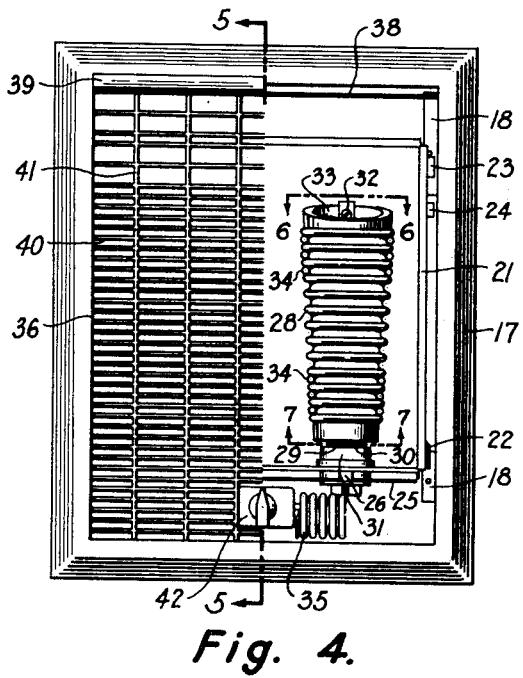
Figure 4 is a front elevational view of an assembled heater embodying the principles of my invention, the front grill being removed in the right-hand half of the figure.
Figure 6:
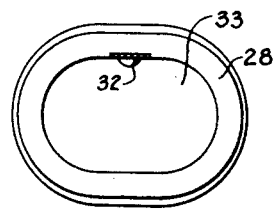
Figure 6 is a partial top plan view, taken along the line 6—6 of Figure 4, of one of the heating elements as seen from above.
Figure 7:
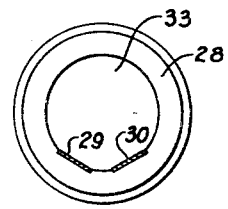
Figure 7 is a partial bottom plan view, taken along the line 7—7 of Figure 4, of one of the heating elements as seen from below.

As will be seen from an inspection of Figures 4, 6 and 7, the flue 33 at the bottom of the element is circular in shape and is of relatively small cross section. As it rises through the element, the flue widens out into an elliptically shaped opening at the top, the latter opening being of substantially larger area than the opening at the bottom. The general shape of the flue may be described as being substantially that of an inverted conical frustum, the frustum being flattened at its wider, top surface in order to reduce the depth of the element and consequently that of the heater. This feature provides room for the air as it is heated and expands during its passage upwardly through the flue, and thus increases the velocity of the flow of air. By actual experiment at the Industrial Research Institute of the University of Chattanooga, it has been found that, as compared with a heating element of cylindrical shape, the flow of air through the flue of an element made in accordance with my invention is one-third greater, where the cylindrical element has the same cross sectional area as does the bottom of an element made in accordance with my invention.

To the thermostat bracket 20 secured to the bottom of the frame 17 is attached a thermostat generally indicated at 35. This thermostat is suitably connected to the wiring leading to the heating elements 28 to control their operation. The thermostat itself is old, as is its manner of connection in the circuit. What is believed to be new is the provision of the heat shielding plate 25, forming with the bottom of the deflector 21 a double-walled insulator shielding the thermostat from the heat generated by the heating element.

A grill 36, which may be a stamping of a sheet metal, such as aluminum or steel, is provided for enclosing the heater to prevent possible injury to persons getting near it. The grill is secured in place at the bottom by means of two small studs 37 extending downwardly from its lower edge at each side. The studs 37 are inserted through holes provided in the lower horizontal member of the frame 17. To the top of the grill is attached by suitable means, as by welding, and air baffle plate 38, the outline of which may be seen clearly in Figure 5. At its outer edge 39, the baffle plate is curved so as to direct the heated air which rises between the back of the deflector 21 and the wall box 11 outwardly away from the wall above the wall box. This feature helps to keep the wall clean and to direct the air outwardly to promote its circulation in the room being heated. After the studs 37 are in place, the top of the grill is lifted and pushed inwardly until a pair of transverse slots in the sides of the baffle plate 38 are in registry with the upper clips 18, when the grill and baffle plate are lowered, the clips passing through the slots to hold the baffle plate and grill in place. It will thus be seen that I have provided a grill which may be easily removed and replaced by hand, requiring the use of no tools, and which facilitates cleaning of the heater.

It will be noted from an inspection of Figure 4 of the drawings that the horizontal bars 40 of the grill greatly predominate in number as compared to the number of vertical bars 41. This feature contributes to a higher accuracy of the thermostatic control because there is relatively little metal extending in a vertical direction to conduct heat downwardly from the vicinity of the heating elements to the vicinity of the thermostat, where it would preheat the air going to the thermostat. It will also be noted that the horizontal bars 40 of the grill are spaced closely together in the lower part of the grill, which is opposite the heating elements, in order to prevent children or others from putting their fingers through the grill into contact with the heating elements. At the upper part of the grill above the heating elements, on the other hand, the horizonal bars 40 are spaced comparatively widely apart, so that they will offer little resistance to the flow of the heated air between them. In the lower part of the grill, a suitable opening is provided for a control knob 42 of conventional design to control the degree of heat delivered by the heater. This control also cuts the heater off entirely when desired.

In Figures 8 and 9 there is illustrated an adaptation of my invention to a portable type of heater, in which a casing or housing 11, corresponding to the wall box in the wall type heater is supported by suitable feet 43 resting on the floor. As in the case of the wall type heater, one or more heating elements 28 are supported therein, the operation of which is controlled by a heat control switch 42 and a thermostat 35 positioned below the elements and separated therefrom by a double-walled space formed by the bottom of a deflector box 21 and a shielding plate 25, substantially in the same manner as in the wall type heater. As in the case of the wall type heater, the elements 28 are formed substantially in the shape of inverted conical frustums in order to speed up the flow of air through them.

It will be apparent that, by my invention, I have provided an improved heater of the convection type which accelerates the flow of air through the heater, thereby reducing the radiation temperature with its consequent hazard and also speeding up the heating of a room. This result is achieved due to the upwardly expanding shape of the heating elements, providing room for expansion of the air as it is heated.

The disadvantages of a fan are eliminated, at the same time retaining substantially the advantages of quick heat circulation and of low operating temperature provided by a heater of the fan type. There are no moving parts to get out of order and no lubrication is required. Also, there is no vibration noise such as is found with fan type heaters not securely installed and there is no noise caused by fan blades beating the air.

Assembly of the wall type heater is simple. The wall box is fastened to the wall with wood screws, the frame is bolted to the wall box and the deflector is then set in place. The electrodes of the heating elements are then connected to the lead-in wires and the grill is put in place.

Removal of the deflector unit is a simple matter when it is necessary for repairs or for major cleaning. The electrodes are disconnected from the lead-in wires. The deflector can then be lifted until the clips 22 clear the supporting tabs 18. The bottom of the deflector is then moved out of the wall box, followed by the top, which can also be pulled out of the wall box when the upper clips 23 pass below the upper angle clips 16 on the frame.

If it is desired to remove and/or renew one of the heating elements, all that is required is to unscrew the fastenings of the lead-in wires to the electrodes and to remove the single screw holding the element at its top. The thermostat is also easily removable and replaceable.

Another advantage of my invention is that a built-in thermostat is provided, with its attendant convenience and its inexpensive installation, which is considerably more accurate than built-in thermostats heretofore known, principally due to the provision of adequate insulation between the thermostat and the heating elements. This insulation also reduces the overall height of the heater and thus makes possible its installation below very low windows, since the thermostat can be placed up close below the insulation. Formerly, only fan type electric heaters could be installed below as low a window.

A wall type heater made in accordance with my invention is compact in a horizontal dimension as well as the vertical, due to its efficiency in heat transfer. This makes possible the use of a heater having a capacity as great as two kilowatts installed between studs with a standard spacing of 16 inches. Thus, installation is simplified and made inexpensive.

A further advantage of my invention is that a heater made in accordance with it may be easily cleaned to remove dust, cobwebs and the like. In order to clean behind the heater, it is a simple matter to remove the grill and then tilt forward the deflector box.

I claim:

1. An air heater comprising a wall box having an open front and adapted to be secured in an opening in a wall, a pair of fulcrums at each side and at least one tab on one side supported by said wall box, a heat deflector in said wall box pivotally supported by said fulcrums for swinging outwardly through the open front of said wall box, at least one heating element supported by said deflector and at least one stop secured to said deflector for engaging said tab to limit the swinging of said deflector.

2. An air heater comprising a wall box having an open front and adapted to be secured in an opening in a wall, a pair of fulcrums supported by said wall box at each side and near the front thereof, a heat deflector in said wall box pivotally supported by said fulcrums for swinging outwardly through the open front of said wall box and at least one hollow vertical heating element supported by said deflector, said element being open at both ends and having a flue extending between its ends and increasing in cross sectional area from bottom to top.

3. An air heater comprising a wall box having an open front and adapted to be secured in an opening in a wall, a pair of vertical strips supported by said wall box at each side and near the front thereof, a heat deflector in said wall box pivotally supported by said strips for swinging outwardly, at least one hollow inverted flattened frusto-conical heating element circular at its smaller end and in the shape of a flattish oval at its larger end, said element being open at both ends and being supported by said deflector, a thermostat supported adjacent said heating element for controlling same and a double-walled heat insulating space interjacent said heating element and said thermostat.

4. An air heater comprising a wall box having an open front and adapted to be secured in an opening in a wall, a pair of fulcrums supported by said wall box at each side and near the front thereof, a heat deflector in said wall box pivotally supported by said fulcrums for swinging outwardly, at least one hollow flattened non-cylindrical vertical heating element supported by said deflector, said element being open at both ends and having a larger area of opening at its top than at its bottom, a temperature-responsive device supported in said wall box for controlling said heating element and a double-walled heat-insulating space interposed between said heating element and said temperature-responsive device.

5. An air heater comprising a wall box having an open front and adapted to be secured in an opening in a wall, a pair of fulcrums supported by said wall box at each side and near the front thereof, a heat deflector in said wall box pivotally supported by said fulcrums for swinging outwardly, at least one hollow inverted flattened frusto-conical heating element open at both ends supported by said deflector, a temperature-responsive device supported in said wall box for controlling said heating element and a double-walled heat-insulating space intervening between said heating element and said temperature-responsive device.

6. An air heater comprising a casing having an open front, a heat deflector supported in the casing, the deflector having one double wall formed by a pair of plates of substantially equal area spaced from each other, at least one vertical heating element supported in the deflector above the double wall, the double wall being adjacent the intake end of the heating element, and a thermostat for controlling the heating element supported in the casing below the double wall of the deflector.

7. An air heater comprising a casing having an open front, a heat deflector supported in the casing, the deflector having one unbroken double wall formed by a pair of metallic plates of substantially equal area spaced from each other to form a heat insulation, at least one vertical heating element supported in the deflector above the double wall, the double wall being adjacent the lower end of the heating element, and a thermostat for controlling the heating element supported in the casing below the double wall of the deflector.

8. An air heater comprising a casing having an open front, a heat deflector supported in the casing, the deflector having a bottom uninterrupted double wall formed by a pair of heat conductive shields of approximately equal area spaced from each other, at least one vertical heating element supported in the deflector above the double wall, the double wall being adjacent the intake end of the heating element, and a temperature-responsive device for controlling the heating element supported in the casing below the double wall of the deflector.

9. An air heater comprising a casing having an open front, a heat deflector supported in the casing, the deflector having a bottom double wall formed by a pair of plates of nearly equal area spaced from each other, at least one vertical heating element supported in the deflector above the double wall, the heating element having a flue extending between its ends of a cross sectional area increasing from bottom to top and a temperature-responsive device for controlling the heating element supported in the casing below the double wall of the deflector.

10. An air heater comprising a wall box having an open front and adapted to be secured in an opening in a wall, a pair of fulcrums supported by said wall box at each side, a heat deflector pivotally supported in said wall box by said fulcrums for swinging outwardly through the open front of said wall box, the deflector having one double wall formed by a pair of plates of substantially equal area spaced from each other, at least one vertical heating element supported in the deflector with its intake end above and adjacent to the double wall and a thermostat for controlling the heating element supported in the wall box below the double wall of the deflector.

11. An air heater comprising a wall box having an open front and adapted to be secured in an opening in a wall, a pair of fulcrums at each side supported by said wall box, a heat deflector in said wall box pivotally supported by said fulcrums for swinging outwardly through the open front of said wall box and at least one heating element supported in said deflector.

12. An electric space heater comprising a heat deflector box open on one vertical side and at least one hollow vertical heating element supported in said box, said element having its bottom approximately circular in cross section and its top somewhat flattened in cross section and substantially larger than its bottom, said element being open at both ends with a substantially larger opening at its top than at its bottom and having a flue extending between its ends, and increasing substantially in cross sectional area from bottom to top.

13. An electric space heater comprising a deflector box having one vertical side thereof open, and a heating element vertically mounted in said box, said element having a flue opening extending vertically therethrough for convection heating of air therethrough, said opening being open to the air at both its lower and upper ends, said opening being substantially tapered outwardly from bottom to top and being substantially larger in cross-sectional area at its upper end than at its lower end, the sole means of circulating air up through said opening being the convection heating thereof.

14. An electric space heater comprising a deflector box having three vertical deflecting sides and one vertical side thereof open, and a heating element vertically mounted in said box within said four sides, said element having a flue opening extending vertically therethrough for convection heating of air therethrough, said opening being open to the air at both its upper and lower ends, and being substantially larger in cross-sectional area at its upper end than at its lower end, said opening and the exterior surface of said element each having its horizontal dimension taken normal to said open side substantially equal at both the top and the bottom, and said opening and exterior each being tapered outwardly from bottom to top along its other horizontal dimension.

15. An electric space heater comprising a deflector box having three vertical deflecting sides and one vertical side thereof open, and a heating element vertically mounted in said box within said four sides, said element having a flue opening extending vertically therethrough for convection heating of air therethrough, said opening being open to the air at both its upper and lower ends, and being substantially larger in cross-sectional area at its upper end than at its lower end, said opening being substantially circular at its lower end and having a substantially flat sided oval shape at its upper end, the flat sides of said opening being substantially parallel to said open side of said box.

16. An electric space heater comprising a deflector box having three vertical deflecting sides and one vertical side thereof open, and a heating element vertically mounted in said box within said four sides, said element having a flue opening extending vertically therethrough for convection heating of air therethrough, said opening being open to the air at both its upper and lower ends and being substantially larger in cross-sectional area at its upper end than at its lower end, said opening being substantially circular at its lower end and having a substantially flat sided oval shape at its upper end, the flat sides of said opening being substantially parallel to said open side of said box, the radius of said opening at its lower end being substantially equal to the radius of the semi-circular ends forming said oval shape.

MELVIN H. WESSEL.

(References on following page)

References Cited in the file of this patent

UNITED STATES PATENTS

| Number | Name | Date |
|---|---|---|
| 1,332,052 | Martin | Feb. 24, 1920 |
| 1,534,221 | Kercher et al. | Apr. 21, 1925 |
| 1,694,175 | Hauser | Dec. 4, 1928 |
| 1,704,479 | Kercher | Mar. 5, 1929 |
| 1,724,198 | Hauser | Aug. 13, 1929 |
| 2,153,050 | Pfaffle | Apr. 4, 1939 |
| 2,455,967 | Adams | Dec. 14, 1948 |
| 2,486,309 | McIntosh | Oct. 25, 1949 |

FOREIGN PATENTS

| Number | Country | Date |
|---|---|---|
| 285,599 | Great Britain | Feb. 23, 1928 |
| 726,688 | France | Mar. 8, 1932 |